United States Patent
Joon-Ki et al.

(10) Patent No.: US 8,208,748 B2
(45) Date of Patent: Jun. 26, 2012

(54) APPARATUS AND METHOD FOR IMAGE INTERPOLATION BASED ON LOW PASS FILTERING

(75) Inventors: Paik Joon-Ki, Seoul (KR); Yoon-Jong Yoo, Gyeonggi-do (KR); Jin-Young Youn, Daegu (KR); Dong-Gyun Kim, Seoul (KR); Jeong-Ho Shin, Seoul (KR)

(73) Assignee: Chung-Ang University Industry Academy Cooperation Foundation, Seoul (KR)

( * ) Notice: Subject to any disclaimer, the term of this patent is extended or adjusted under 35 U.S.C. 154(b) by 657 days.

(21) Appl. No.: 12/407,900

(22) Filed: Mar. 20, 2009

(65) Prior Publication Data
US 2009/0238488 A1    Sep. 24, 2009

(30) Foreign Application Priority Data
Mar. 20, 2008  (KR) .......................... 10-2008-0025773

(51) Int. Cl.
*G06K 9/40* (2006.01)
*G06K 9/32* (2006.01)
(52) U.S. Cl. .......................... 382/264; 382/266; 382/300
(58) Field of Classification Search .................. 382/264, 382/266, 300, 305, 312; 358/3.27, 525; 348/252; 345/606
See application file for complete search history.

(56) References Cited

U.S. PATENT DOCUMENTS

| | | | | |
|---|---|---|---|---|
| 6,570,673 B2 * | 5/2003 | Kishimoto | ..................... | 358/1.2 |
| 6,731,342 B2 * | 5/2004 | Shin et al. | ..................... | 348/452 |
| 7,483,040 B2 * | 1/2009 | Michel | ..................... | 345/606 |
| 7,486,844 B2 * | 2/2009 | Chang et al. | ..................... | 382/300 |
| 7,944,503 B1 * | 5/2011 | Zhai et al. | ..................... | 348/452 |
| 7,982,798 B2 * | 7/2011 | Adams | ..................... | 348/448 |

\* cited by examiner

*Primary Examiner* — Kanjibhai Patel
(74) *Attorney, Agent, or Firm* — Occhiuti Rohlicek & Tsao LLP

(57) ABSTRACT

An apparatus and method for image interpolation based on low pass filtering are provided. The apparatus includes an edge direction detector detecting an edge direction for a pixel nearest to a to-be-interpolated pixel among pixels and determining the edge direction of the to-be-interpolated pixel as the detected edge direction, a pixel value calculator calculating pixel values of interpolation points located in a lattice filtering window having a predetermined size by using pixel values of pixels located adjacent to the interpolation points, and a filtering unit performing low pass filtering on the to-be-located pixel according to a low pass filter corresponding to the determined edge direction of the to-be-interpolated pixel, the low pass filter being one of low pass filters corresponding to predetermined vertical, horizontal, left diagonal and right diagonal directions respectively. Accordingly, a process of calculating the pixel value of the to-be-interpolated pixel can be simplified and a processing speed can be increased. Furthermore, it is possible to obtain a high-quality image without having image deterioration such as blocking effect caused by an error in a pixel value even for a region with an uneven edge.

13 Claims, 6 Drawing Sheets

APPARATUS AND METHOD FOR IMAGE INTERPOLATION BASED ON LOW PASS FILTERING

CROSS-REFERENCE TO RELATED APPLICATIONS

This application claims the benefit of priority of Korean Patent Application No. 10-2008-0025773 filed on Mar. 20, 2008, which are incorporated by reference in their entirety herein.

BACKGROUND

1. Field of the Invention

The present invention relates to an apparatus and a method for image interpolation, and more particularly, to an apparatus and a method for allocating a new pixel value to a to-be-interpolated pixel of an image frame to improve the resolution of an image corresponding to the image frame.

2. Related Art

Flat panel displays such as a liquid crystal display (LCD) and a plasma display panel (PDP) have rapidly replaced conventional cathode-ray tubes (CRT) in the recent large-sized display market.

While these flat panel displays have a display area and resolution wider and higher than those of CRTs, the flat panel displays deteriorate the picture quality of standard definition (SD) broadcasting images or digital video disc (DVD) images other than high definition (HD) images when the SD broadcasting images or DVD images are displayed on the flat panel displays because these images have a resolution of 720×480i. Furthermore, if the resolution of an image displayed on a flat panel display does not correspond to the resolution of the flat panel display, pixels of the flat panel display are not one-to-one matched to the image, and thus the image is indistinctly displayed on a screen of the flat panel display to cause objective and subject picture quality deterioration. Accordingly, it is necessary to increase the resolution of the image to the resolution of the flat panel display.

Among conventional methods for improving the resolution of an image, the nearest neighbor interpolation that is a spatial interpolation method allocates a pixel value of a pixel of an original image, which is nearest to a target pixel to which a pixel value will be allocated, to the target pixel. This method does not calculate new pixel values and uses the existing pixel values and thus error may be generated and an undesirable phenomenon such as a staircase phenomenon may occur in a magnified image although it has the advantage of high processing speed,.

Furthermore, the bilinear interpolation sums up values obtained by multiplying pixel values of four pixels of an original image, which are nearest to a target pixel to which a pixel value will be allocated, by weights and allocates the summed value to the target pixel. Here, the weights are determined through a linear method and is in inverse proportion to distances between the four pixels and the target pixel. The bilinear interpolation generates less error in an image as compared to the nearest neighbor interpolation although it requires many computing operations. However, the bilinear interpolation allocates a pixel value to an empty pixel only according to calculation of a pixel, and thus blocking effect may be generated.

SUMMARY

It is an object of the present invention to provide an apparatus and method for image interpolation capable of obtaining a high-quality image from an original image even if the original image has an uneven edge without having an undesirable phenomenon such as image blurring or blocking effect to improve the resolution of the original image.

It is another object of the present invention to provide a computer readable recording medium storing a program for executing a method for image interpolation capable of obtaining a high-quality image from an original image even if the original image has an uneven edge without having an undesirable phenomenon such as image blurring or blocking effect to improve the resolution of the original image.

An apparatus for image interpolation based on low pass filtering according to an aspect of the present invention comprises an edge direction detector detecting an edge direction for a pixel nearest to a to-be-interpolated pixel among pixels and determining the edge direction of the to-be-interpolated pixel as the detected edge direction, the pixels having determined pixel values in an image frame, a pixel value calculator calculating pixel values of interpolation points located in a lattice filtering window having a predetermined size by using pixel values of pixels located adjacent to the interpolation points, the lattice filtering window having the to-be-interpolated pixel at the center therein, and a filtering unit performing low pass filtering on the to-be-located pixel according to a low pass filter corresponding to the determined edge direction of the to-be-interpolated pixel, the low pass filter being one of low pass filters corresponding to predetermined vertical, horizontal, left diagonal and right diagonal directions respectively.

A method for image interpolation based on low pass filtering according to an aspect of the present invention comprises the steps of detecting an edge direction for a pixel nearest to a to-be-interpolated pixel among pixels and determining the edge direction of the to-be-interpolated pixel as the detected edge direction, the pixels having determined pixel values in an image frame, calculating pixel values of interpolation points located in a lattice filtering window having a predetermined size by using pixel values of pixels located adjacent to the interpolation points, the lattice filtering window having the to-be-interpolated pixel at the center therein, and performing low pass filtering on the to-be-located pixel according to a low pass filter corresponding to the determined edge direction of the to-be-interpolated pixel, the low pass filter being one of low pass filters corresponding to predetermined vertical, horizontal, left diagonal and right diagonal directions respectively.

According to the image interpolating apparatus and method based on low pass filtering according to the present invention, a computing process can be simplified and a processing speed can be increased because a pixel value of a to-be-interpolated pixel is determined by using pixel values of pixels of an original image. Furthermore, low pass filtering according to the direction of an edge corresponding to the to-be-interpolated pixel is performed when the image is interpolated, and thus the boundary of a region having an uneven edge is smoothened to obtain a high-quality image without having image deterioration such as blocking effect caused by an error in a pixel value.

DESCRIPTION OF EXEMPLARY EMBODIMENTS

Hereinafter, an image interpolating apparatus and method according to an embodiment of the present invention will be described below with reference to the accompanying drawings.

Figure 1:
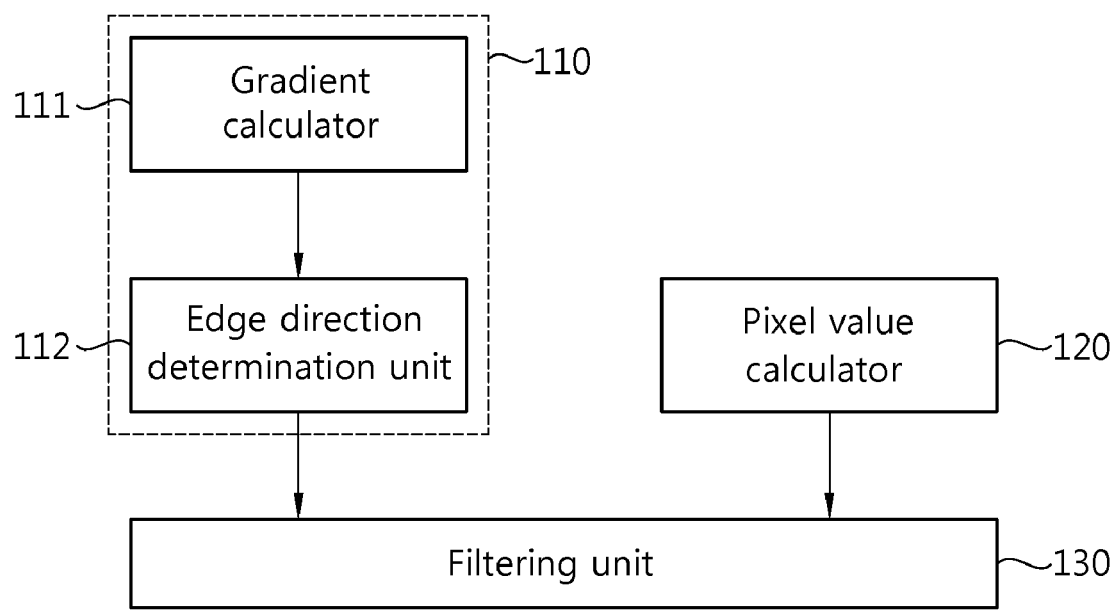
FIG. 1 is a block diagram of an apparatus for image interpolation based on low pass filtering according to an embodiment of the present invention.

FIG. 1 is a block diagram of an apparatus for image interpolation based on low pass filtering according to an embodiment of the present invention.

Referring to FIG. 1, the image interpolating apparatus based on low pass filtering according to an embodiment of the present invention includes an edge direction detector 110, a pixel value calculator 120 and a filtering unit 130.

The edge direction detector 110 detects the direction of an edge corresponding to a pixel nearest to a to-be-interpolated pixel to which a pixel value will be allocated among pixels having determined pixel values in an image frame and determines the detected edge direction as an edge direction of the to-be-interpolated pixel. The edge direction detector 110 includes a gradient calculator 111 and an edge direction determination unit 112.

Methods for determining the edge direction of a pixel include a method of calculating gradient values by using pixel values in a spatial domain and a method of analyzing a component of a pixel in a frequency domain and determining the edge direction of the pixel. The edge detection method in the frequency domain may generate a load when converting a pixel in the spatial domain to the frequency domain and has a complicated computing process although this method has high accuracy because it can detect various edge directions. Furthermore, it is necessary to quantize a detected edge direction of a pixel because the number of filters corresponding to edge directions are restricted when filtering is performed on the pixel, and thus it is desirable to determine an edge direction based on a gradient value calculated in the spatial domain for rapid computations.

The gradient calculator 111 sums up pixel values of pixels located on each of both sides of each of straight lines that respectively pass through a target pixel for which an edge direction will be detected in edge directions, that is, a vertical direction, a horizontal direction and two diagonal directions, for pixels belonging to an edge detection window having a predetermined size (for example, 3×3 pixels), which has the target pixel located at the center thereof, divides the summed value by the number of pixels located on each of both sides of each of the straight lines to obtain the average and calculates a difference between the averages respectively corresponding to the pixels located on both sides of each of the straight lines to obtain a gradient value corresponding to each edge direction.

Figure 2:
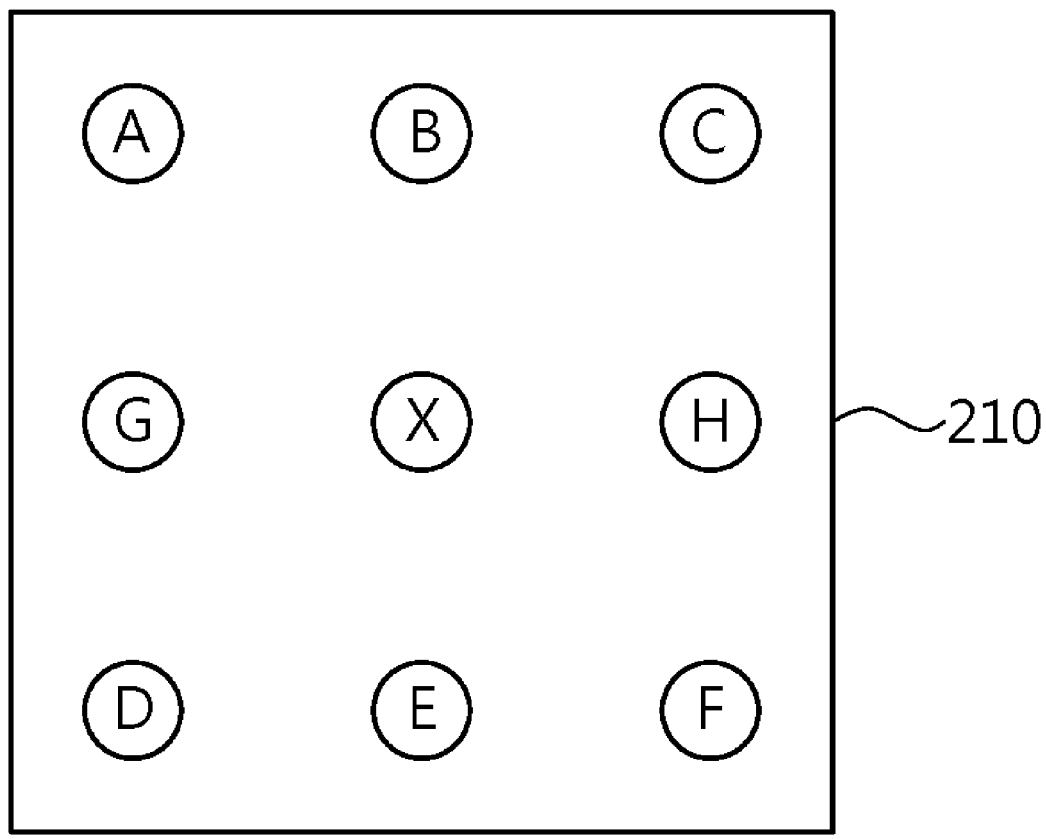
FIG. 2 illustrates an edge detection window 210 set in an image frame and pixels X, A, B, C, D, E, F, G and H belonging to the edge detection window.

FIG. 2 illustrates an edge detection window 210 set in an image frame and pixels X, A, B, C, D, E, F, G and H belonging to the edge detection window 210.

Referring to FIG. 2, X is a pixel nearest to a to-be-interpolated pixel and corresponds to a target pixel for which an edge direction will be detected and A through H represent pixels belonging to the edge detection window 210. The target pixel X is located at the center of the edge detection window 210. It is desirable that the edge detection window 210 has a size of 3×3 pixels in order to simplify a computing operation for calculating gradient values.

The gradient calculator 111 sums up pixel values of pixels located on both sides of each of the straight lines that respectively pass through the target pixel X in edge directions, that is, a vertical direction, a horizontal direction and two diagonal directions, according to Equation 1. When a gradient value corresponding to the horizontal direction is calculated, for instance, the gradient calculator 111 respectively sums up pixel values of the pixels A, B and C and pixel values of the pixels D, E and F and divides the summed values by 3 to obtain averages of the summed values. Then, the gradient calculator 111 calculates a difference between the average values to obtain the gradient value corresponding to the horizontal direction, that is, $|(A+B+C)/3-(D+E+F)/3|$. When the edge detection window 210 is determined based on a target pixel located in a marginal region of the image frame, a point at which any pixel does not exist may be generated in the edge detection window 210. In this case, gradient values are calculated on the assumption that the pixel value of the point at which any pixel does not exist is 0.

$$Di_{hor}=|(A+B+C)/3-(D+E+F)/3|$$

$$Di_{ver}=|(A+D+G)/3-(C+F+H)/3|$$

$$Di_{45}=|(A+B+G)/3-(E+F+H)/3|$$

$$Di_{135}=|(B+C+H)/3-(E+F+H)/3|$$ [Equation 1]

Here, $Di_{hor}$ and $Di_{ver}$ respectively represent horizontal and vertical gradient values, $Di_{45}$ denotes a gradient value in the left diagonal direction and $Di_{135}$ denotes a gradient value in the right diagonal direction.

The edge direction determination unit 112 determines that the edge direction of the to-be-interpolated pixel is an equal direction when a difference between a largest gradient value and a smallest gradient value among the four gradient values calculated by the gradient calculator 111 is smaller than a predetermined reference value and determines an edge direction corresponding to the largest gradient value as the edge direction of the to-be-interpolated pixel when the difference is greater than the reference value. The equal direction represents that a specific edge direction does not exist. The reference value used to determine the equal direction is experimentally determined and may correspond to 17 in order to derive a proper result for the edge direction. When the reference value is 0, the edge direction of the to-be-interpolated pixel is determined to be the equal direction only when the four gradient values calculated by the gradient calculator 111 have the same value. The edge direction of the to-be-interpolated pixel, determined by the edge direction determination unit 112, becomes a basis of determining a low pass filter used to perform low pass filtering on the to-be-interpolated pixel. When multiple pixels are located in the same distance from the to-be-interpolated pixel, an edge direction in which a largest number of pixels are located is determined as the edge direction of the to-be-interpolated pixel.

The pixel value calculator 120 calculates a pixel value of an interpolation point located in a filtering window having a predetermined size (for example, 5×5 pixels), which has the to-be-interpolated pixel located at the center thereof, by using pixel values of pixels located near the interpolation point. Here, the pixel value of the interpolation point is calculated by summing up values obtained by respectively multiplying the pixel values of the pixels located near the interpolation point by weights corresponding to distances between the pixels and the interpolation point. The weights are inversely proportional to the distances between the pixels and the interpolation point.

Figure 3:
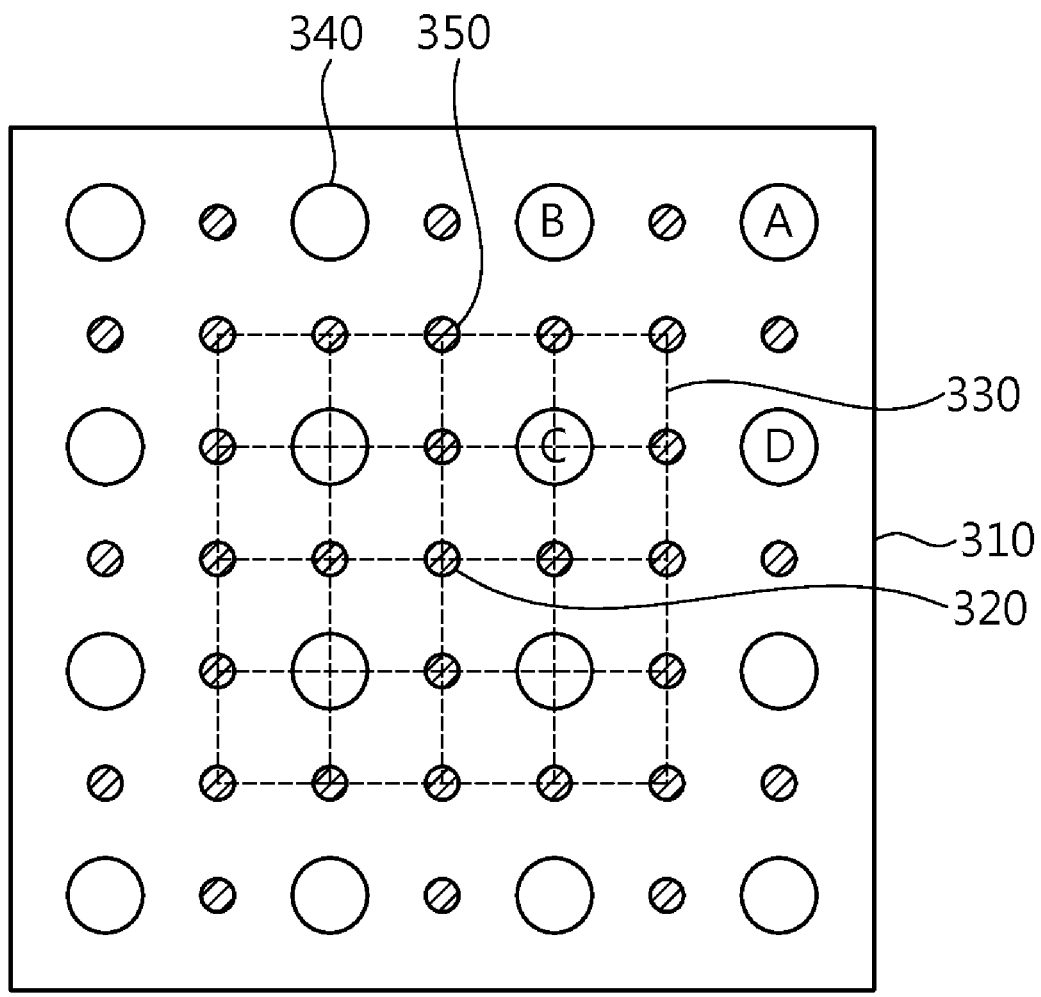
FIG. 3 illustrates interpolation points 350 corresponding to cross points other than cross points at which pixels 340 of an image frame 310 are located among cross points of a lattice filtering window 330 having a to-be-interpolated pixel 320 of the image frame 310 at the center thereof.

FIG. 3 illustrates interpolation points 350 respectively corresponding to cross points other than cross points at which pixels 340 of an image frame 310 are located among cross points of a lattice filtering window 330 having a to-be-interpolated pixel 320 of the image frame 310 at the center thereof. It is desirable to determine the size of the filtering window 330 as 5×5 pixels in order to rapidly perform a computing operation while sufficiently considering edge directions. Furthermore, it is possible to determine the size of the filtering window 330 by multiplying the size of the edge detection window 210 by a ratio of the size of the image frame including the to-be-interpolated pixel to the size of the image frame including only the original pixels.

When a pixel value of a point i among the interpolation points 350 in the filtering window 330 is calculated, the pixel value calculator 120 sums up values obtained by respectively multiplying pixel values of four pixels A, B, C and D located near the point i by weights calculated according to Equation 2.

$$a = SX \times SY$$

$$b = (1-SX) \times SY$$

$$c = (1-SX) \times (1-SY)$$

$$d = SX \times (1-SY)$$ [Equation 2]

Here, a, b, c and d respectively represent the weights multiplied by the pixels A, B, C and D, SX represents a ratio of a distance between neighboring cross points of the filtering window 330 to a distance between neighboring pixels 340 in the horizontal direction, and SY denotes a ratio of the distance between neighboring cross points of the filtering window 330 to a distance between neighboring pixels 340 in the vertical direction.

When the pixel value calculator 120 calculates pixel values of all the interpolation points 350 in the filtering window 330, the filtering unit 130 performs low pass filtering on the to-be-interpolated pixel according to a low pass filter corresponding to the determined edge direction of the to-be-interpolated pixel among low pass filters respectively corresponding to the vertical direction, horizontal direction and two diagonal directions.

Low pass filtering performed according to the edge direction of a pixel reduces and smoothens an RF component so as to restrain image deterioration such as blocking effect due to an abrupt variation in a pixel value. When the low pass filtering operation is performed after the pixel values of all the interpolation points in the image frame are determined by the pixel value calculator 120, an additional memory is needed and it is difficult to execute the filtering operation in hardware that requires sequential processing. Accordingly, it is desirable to determine the pixel values of the interpolation points 350 including the to-be-interpolated pixel 320 in the filtering window 330 and, at the same time, to perform low pass filtering on the to-be-interpolated pixel 320.

Figure 4:
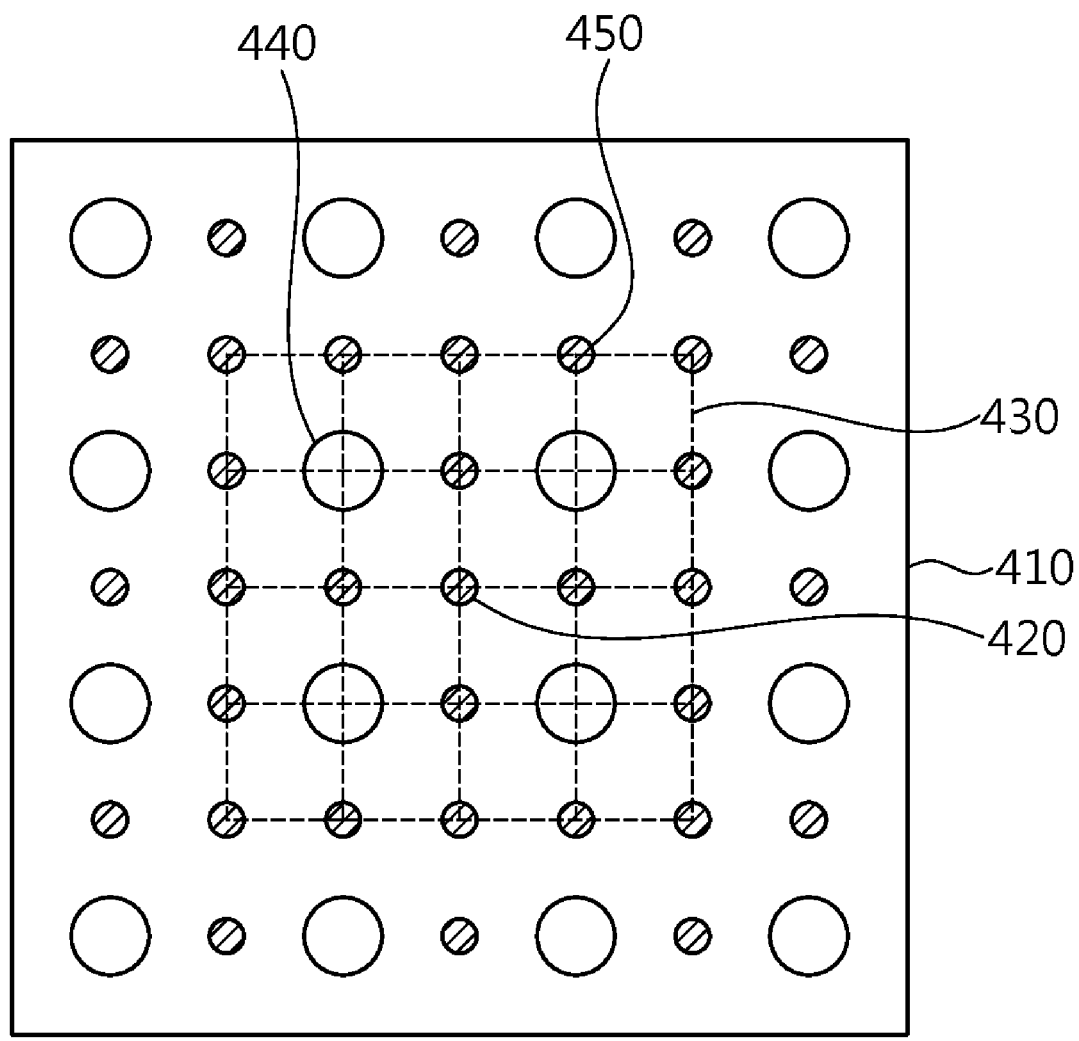
FIG. 4 illustrates a case where pixels 440 are located at cross points of a lattice filtering window 430 having a to-be-interpolated pixel 420 of an image frame 410 determined to perform low pass filtering at the center thereof.
Figure 5:
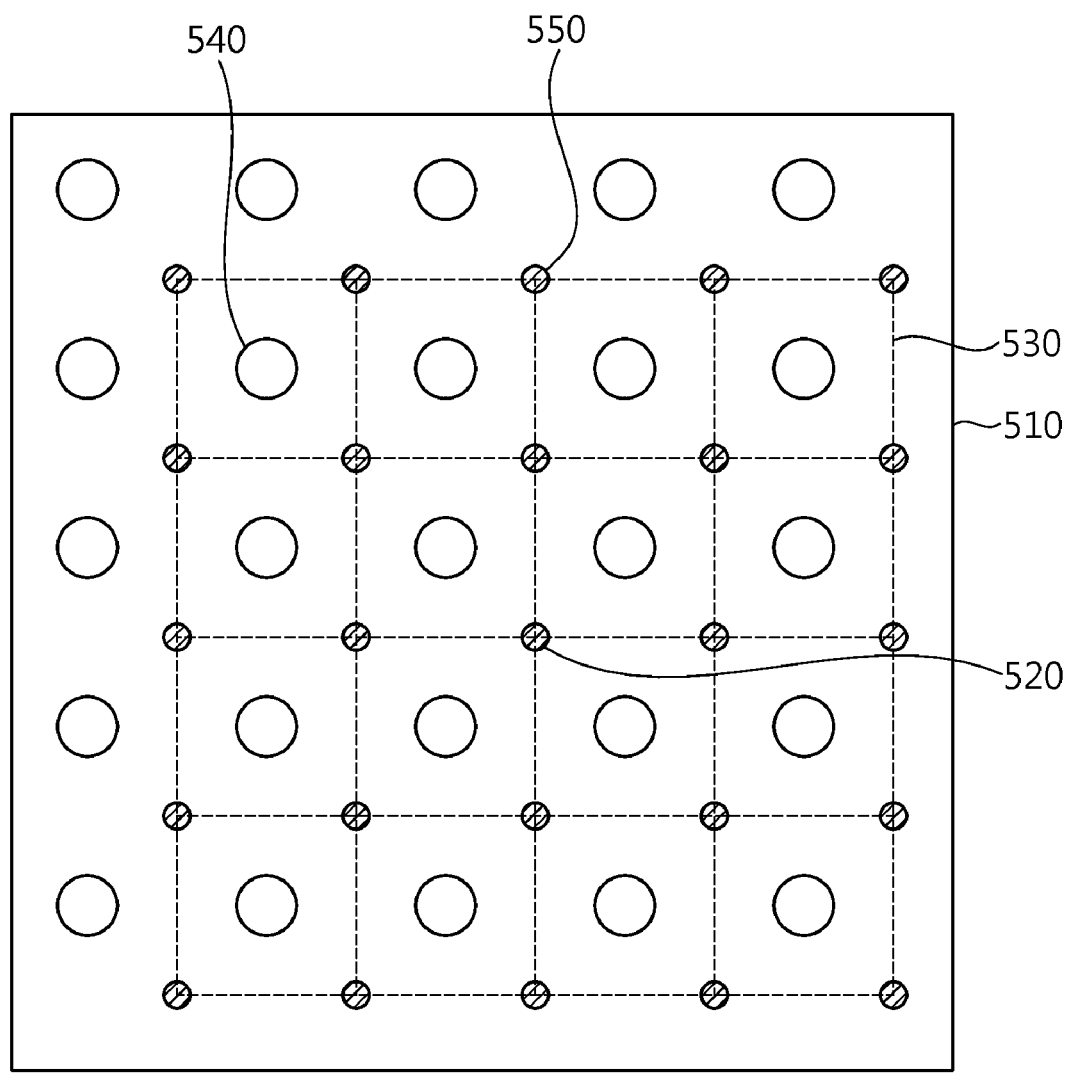
FIG. 5 illustrates a case where pixels 540 are not located at cross points of a lattice filtering window 530 having a to-be-interpolated object 520 of an image frame 510 determined to perform low pass filtering at the center thereof.

FIG. 4 illustrates a lattice filtering window 430 having a to-be-interpolated pixel 420 of an image frames 410 at the center thereof, which is determined in order to perform low pass filtering and FIG. 5 illustrates a lattice filtering window 530 having a to-be-interpolated pixel 520 of an image frames 510 at the center thereof, which is determined in order to perform low pass filtering. When there is a cross point at which any pixel does not exist among cross points of the filtering windows 430 and 530, the pixel value of the cross point is considered to be 0.

Referring to FIGS. 4 and 5, the filtering unit 130 sums up values obtained by multiplying pixel values of pixels located at all the cross points of the filtering window 430 or 530 by a filter coefficient determined corresponding to the edge direction of the to-be-interpolated pixel 420 or 520 according to Equation 3 to produce a new pixel value of the to-be-interpolated pixel 420 or 520. When pixels 440 are located at cross points of the filtering window 430, as illustrated in FIG. 4, low pass filtering is performed based on pixel values of the pixels 440 and interpolation points 450 including the to-be-interpolated pixel 420. However, when pixels 540 are not located at cross points of the filtering window 530, as illustrated in FIG. 5, pixel values of interpolation points 550 including the to-be-interpolated pixel 520 are multiplied by a filter coefficient of a low pass filter.

$$h(x) = e^{(X/2\sigma)^2}$$ [Equation 3]

Here, h(x) represents the filter coefficient of the low pass filter, X denotes a distance between the center 420 or 520 of the filtering window 430 or 530 and each cross point, and σ is a parameter that adjusts the filter coefficient.

The parameter σ determined according to Equation 4 differs depending on the edge direction determined for the to-be-interpolated pixel 420 or 520. As the parameter increases, a filtering range is widened and a degree of smoothing increases.

$$\sigma = \alpha \times I_r + \beta$$ [Equation 4]

Here, σ represents the parameter, α denotes a proportional coefficient that reflects a filter response according to the cut-off frequency of the low pass filter in the frequency domain, $I_r$ represents a resolution extension ratio of the image frame, and β denotes a constant that adjusts distinctness of a filtered image.

The proportional coefficient σ is a gradient when a minimum filter response is derived according to a frequency and represented as a primary function graph. The proportional coefficient σ is 0.013182 when the minimum filter response is obtained according to Nyquist rate that the cutoff frequency of a filter must be less than twice a sampling frequency to produce a gradient.

The resolution extension ratio $I_r$ corresponds to a ratio of the size of an image frame composed of only original pixels to the size of an image frame including a to-be-interpolated pixel. The constant β is a value that controls a smoothing degree of an image according to filtering. The parameter a increases as the constant β increase, and thus the filtering range is widened to increase the smoothing degree.

Figure 6:
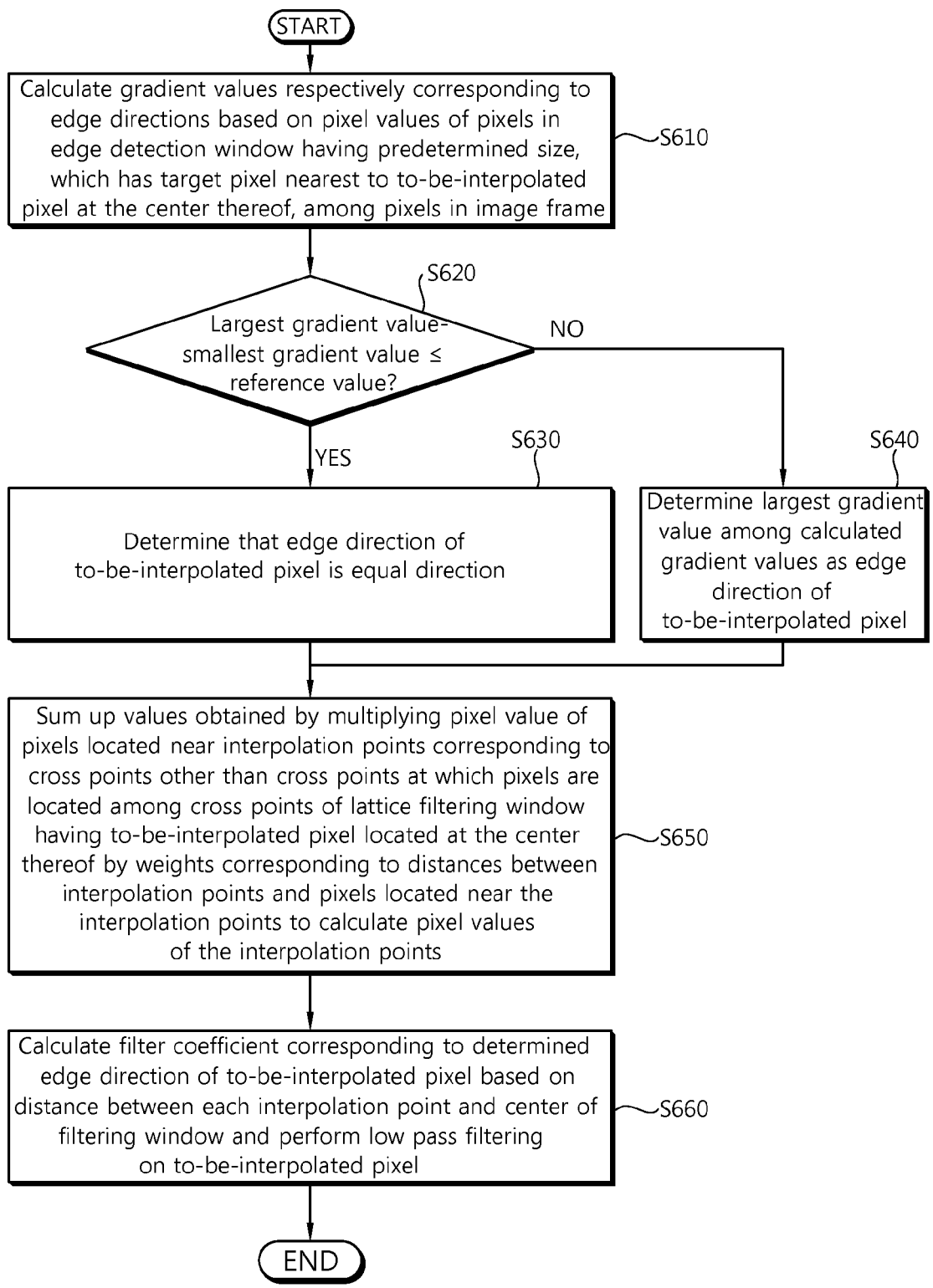
FIG. 6 is a flowchart illustrating a method for image interpolation based on low pass filtering according to an embodiment of the present invention.

FIG. 6 is a flowchart illustrating a method for image interpolation based on low pass filtering according to an embodiment of the present invention.

Referring to FIGS. 1 and 6, the gradient calculator 111 calculates gradient values in four edge directions, that is, a vertical direction, a horizontal direction and two diagonal directions, based on pixel values of pixels belonging to an edge detection window having a predetermined size, which has a target pixel nearest to a to-be-interpolated pixel to which a pixel value will be allocated at the center thereof, among pixels having determined pixel values in an image frame in step S610. The gradient values are calculated according to Equation 1.

Subsequently, the edge direction determination unit 112 compares a difference between a largest gradient value and a smallest gradient value among the gradient values calculated for the four edge directions with a predetermined reference value in step S620, determines that the edge direction of the to-be-interpolated pixel is an equal direction when the difference is smaller than the reference value in step S630 and determines an edge direction corresponding to the largest gradient value as the edge direction of the to-be-interpolated pixel when the difference is greater than the reference value in step S640.

Then, the pixel value calculator 120 sums up values obtained by multiplying pixel values of pixels located near interpolation points corresponding to cross points other than cross points at which pixels are located among cross points of a lattice filtering window having the to-be-interpolated pixel placed at the center thereof by weights corresponding to distances between the interpolation points and the pixels located near the interpolation points to produce pixel values of the interpolation points in step S650. The weights are inversely proportional to the distances between the interpolation points and the pixels and are determined according to Equation 2. The interpolation points include the to-be-interpolated pixel.

Finally, when pixel values of all the interpolation points in the filtering window including the to-be-interpolated pixel are determined by the pixel value calculator 120, the filtering unit 130 calculates a filter coefficient corresponding to the determined edge direction of the to-be-interpolated pixel based on a distance between each interpolation point and the center of the filtering window and performs low pass filtering on the to-be-interpolated pixel in step S660. The filter coefficient is calculated according to Equation 3 and a parameter that adjusts the filter coefficient is determined according to Equation 4.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for image interpolation comprising:
an edge direction detector configured to detect an edge direction for a pixel nearest to a to-be-interpolated pixel among pixels and configured to determine the edge direction of the to-be-interpolated pixel as the detected edge direction, the pixels having determined pixel values in an image frame;
a pixel value calculator configured to calculate pixel values of interpolation points located in a lattice filtering window having a predetermined size by using pixel values of pixels located adjacent to the interpolation points, the lattice filtering window having the to-be-interpolated pixel at the center therein; and
a filtering unit configured to perform low pass filtering on the to-be-located pixel according to a low pass filter corresponding to the determined edge direction of the to-be-interpolated pixel, the low pass filter being one of low pass filters corresponding to predetermined vertical, horizontal, left diagonal and right diagonal directions respectively.

2. The apparatus for image interpolation of claim 1, wherein the edge direction detector comprises:
a gradient calculator configured to calculate a first average of pixel values of pixels in one side of a straight line and a second average in the other side of the straight line, and configured to calculate difference between the first average and the second average to produce gradient values, the straight line passing through a target pixel in the vertical, horizontal, left diagonal and right diagonal directions respectively, the pixels in the image frame being included in an edge detection window having a predetermined size, the target pixel being located at the center of the edge detection window, the gradient values respectively corresponding to the vertical, horizontal, left diagonal and right diagonal directions for the pixels; and
an edge direction determination unit configured to determine the edge direction of the to-be-interpolated pixel, wherein the edge direction of the to-be-interpolated pixel is an equal direction when a difference between a largest gradient value and a smallest gradient value among the four gradient values obtained by the gradient calculator is smaller than a predetermined reference value, wherein the edge direction of the to-be-interpolated pixel is the largest gradient value when the difference is greater than the reference value.

3. The apparatus for image interpolation of claim 1 or 2, wherein a pixel value of a coordinate point at which any pixel is not located in the filtering window is 0.

4. The apparatus for image interpolation of claim 1, wherein the pixel value calculator is further configured to locate the to-be-interpolated pixel at the center of the lattice filtering window and sums up values obtained by multiplying pixel values of pixels located near interpolation points respectively corresponding to cross points other than cross points at which pixels are located among cross points of the filtering window by weight corresponding to distances between the interpolation points and the pixels to calculate pixel values respectively corresponding to the interpolation points.

5. The apparatus for image interpolation of claim 1, wherein the filtering unit is configured to calculate a filter coefficient corresponding to the determined edge direction of the to-be-interpolated pixel based on a distance between each of the interpolation positions in the filtering window and the center of the filtering window and to perform low pass filtering on the to-be-interpolated pixel.

6. The apparatus for image interpolation of claim 5, wherein a parameter configured to adjust the filter coefficient is determined by the following equation, $$\sigma = \alpha \times I_r + \beta$$

where σ represents the parameter, α denotes a proportional coefficient that reflects a filter response according to the cutoff frequency of the low pass filter in the frequency domain, Ir represents a resolution extension ratio of the image frame, and β denotes a constant that controls distinctness of a filtered image.

7. A method for image interpolation comprising the steps of:
    detecting an edge direction for a pixel nearest to a to-be-interpolated pixel among pixels and determining the edge direction of the to-be-interpolated pixel as the detected edge direction, the pixels having determined pixel values in an image frame;
    calculating pixel values of interpolation points located in a lattice filtering window having a predetermined size by using pixel values of pixels located adjacent to the interpolation points, the lattice filtering window having the to-be-interpolated pixel at the center therein; and
    performing low pass filtering on the to-be-located pixel according to a low pass filter corresponding to the determined edge direction of the to-be-interpolated pixel, the low pass filter being one of low pass filters corresponding to predetermined vertical, horizontal, left diagonal and right diagonal directions respectively.

8. The method for image interpolation of claim 7, wherein the step of detecting the edge direction comprises the steps of:
    calculating a first average of pixel values of pixels in one side of a straight line and a second average in the other side of the straight line, and calculating difference between the first average and the second average to produce gradient values, the straight line passing through a target pixel in the vertical, horizontal, left diagonal and right diagonal directions respectively, the pixels in the image frame being included in an edge detection window having a predetermined size, the target pixel being located at the center of the edge detection window, the gradient values respectively corresponding to the vertical, horizontal, left diagonal and right diagonal directions for the pixels; and
    determining the edge direction of the to-be-interpolated pixel, wherein the edge direction of the to-be-interpolated pixel is an equal direction when a difference between a largest gradient value and a smallest gradient value among the four gradient values obtained by the gradient calculator is smaller than a predetermined reference value, wherein the edge direction of the to-be-interpolated pixel is the largest gradient value when the difference is greater than the reference value.

9. The method for image interpolation of claim 7 or 8, wherein a pixel value of a coordinate point at which any pixel is not located in the filtering window is 0.

10. The method for image interpolation of claim 7, wherein the step of calculating the pixel values of the interpolation points locates the to-be-interpolated pixel at the center of the lattice filtering window and sums up values obtained by multiplying pixel values of pixels located near interpolation points respectively corresponding to cross points other than cross points at which pixels are located among cross points of the filtering window by weight corresponding to distances between the interpolation points and the pixels to calculate pixel values respectively corresponding to the interpolation points.

11. The method for image interpolation of claim 7, wherein the step of performing low pass filtering calculates a filter coefficient corresponding to the determined edge direction of the to-be-interpolated pixel based on a distance between each of the interpolation positions in the filtering window and the center of the filtering window and performs low pass filtering on the to-be-interpolated pixel.

12. The method for image interpolation of claim 11, wherein a parameter that adjusts the filter coefficient is determined by the following equation, $$\sigma = \alpha \times I_r + \beta$$

where σ represents the parameter, α denotes a proportional coefficient that reflects a filter response according to the cutoff frequency of the low pass filter in the frequency domain, Ir represents a resolution extension ratio of the image frame, and β denotes a constant that controls distinctness of a filtered image.

13. A non-transitory computer readable recording medium storing a program for executing the method for image interpolation of claim 7 on a computer.

* * * * *